US012762612B2

(12) United States Patent
Schmidt-Ammon et al.

(10) Patent No.: US 12,762,612 B2
(45) Date of Patent: Oct. 13, 2026

(54) COMPUTER SYSTEM AND COMPUTER-IMPLEMENTED METHOD FOR BALANCED MATCHING OF OPPORTUNITY DATA WITH ONE OR MORE SPONSOR DATA

(71) Applicant: Aequifin GmbH Und Co. KGAA, Grünwald (DE)

(72) Inventors: Stefan Schmidt-Ammon, Deisenhofen (DE); Frank-Martin Binder, Dachau (DE)

(73) Assignee: Aequifin GmbH Und Co. KGAA, Grünwald (DE)

( * ) Notice: Subject to any disclaimer, the term of this patent is extended or adjusted under 35 U.S.C. 154(b) by 0 days.

(21) Appl. No.: 18/911,456

(22) Filed: Oct. 10, 2024

(65) Prior Publication Data

US 2025/0037195 A1 Jan. 30, 2025

Related U.S. Application Data

(63) Continuation of application No. 17/266,384, filed as application No. PCT/EP2018/071299 on Jun. 8, 2018, now abandoned.

(51) Int. Cl.
*G06Q 10/06* (2023.01)
*G06Q 30/0279* (2023.01)
(Continued)

(52) U.S. Cl.
CPC ......... *G06Q 30/08* (2013.01); *G06Q 30/0279* (2013.01); *G06Q 50/18* (2013.01)

(58) Field of Classification Search
CPC .... G06Q 30/08; G06Q 30/0279; G06Q 50/18; G06Q 40/00
See application file for complete search history.

(56) References Cited

U.S. PATENT DOCUMENTS

2003/0101115 A1* 5/2003 Reddy .................... G06Q 40/00 705/37
2006/0085321 A1* 4/2006 Staib ...................... G06Q 30/08 705/37
(Continued)

OTHER PUBLICATIONS

Non-Final Office Action mailed Jul. 22, 2022, in U.S. Appl. No. 17/266,403 of Stefan Schmidt-Ammon, filed Feb. 5, 2021, 32 pages.

*Primary Examiner* — Maroun P Kanaan
(74) *Attorney, Agent, or Firm* — Blueshift IP; Robert Plotkin

(57) ABSTRACT

The present invention relates to a computer-implemented method for matching opportunity data defining an opportunity and at least one sponsor data item to represent a cooperation for commonly undertaking an endeavor, enterprise or venture, comprising the steps of:

Providing opportunity data about an endeavor, enterprise or venture by an opportunity provider to a computer, wherein the opportunity data is defined by prosecution resources needed to prosecute the opportunity, a best possible outcome in case of success of the prosecution and an ask participation quote, Obtaining, at the computer, a plurality of sponsor data items each including a participation offer in a book-building process wherein the participation offers each include a bid participation quote and an amount of sponsoring resources;

Using the computer, selecting one or more participation offers from the obtained participation offers depending on the ask participation quote, the prosecution resources, as well as on the bid participation quotes and the sponsoring resources of each of the plurality of the sponsor data items; and (Continued)

Using the computer to automatically match the sponsor data items associated with the selected one or more participation offers with the opportunity data.

16 Claims, 7 Drawing Sheets

(51) Int. Cl.

| | |
|---|---|
| ***G06Q 30/08*** | (2012.01) |
| ***G06Q 50/00*** | (2024.01) |
| ***G06Q 50/18*** | (2012.01) |

(56) References Cited

U.S. PATENT DOCUMENTS

| | | | |
|---|---|---|---|
| 2014/0188634 | A1 | 7/2014 | Puntoriero |
| 2018/0075527 | A1 | 3/2018 | Nagla |
| 2024/0062281 | A1 | 2/2024 | Schmidt-Ammon |

* cited by examiner

COMPUTER SYSTEM AND COMPUTER-IMPLEMENTED METHOD FOR BALANCED MATCHING OF OPPORTUNITY DATA WITH ONE OR MORE SPONSOR DATA

TECHNICAL FIELD

The present invention is related to computer-implemented methods for finding cooperation opportunities between parties by processing data to balance interests in an automated manner. Particularly, the present invention relates to a matching method between opportunity data provided by opportunity providers who are willing to share and to prosecute an opportunity and sponsor data provided by parties who are willing to participate on the opportunity defined by the opportunity data by providing resources contributing to the opportunity. Particularly, the present invention relates to a computer-implemented method for matching an opportunity provider having a litigation case on hand with a sponsoring party willing to spend resources for the chance to participate in a successful outcome of the litigation case.

TECHNICAL BACKGROUND

Cooperation of entities is crucial for a successful endeavor, enterprise or venture. Often, opportunities show up which cannot be seized due to the lack of resources so that cooperation of entities is required to lead the opportunity to success. Matching the appropriate cooperating entities, however, is a difficult and time-consuming task in real life.

For instance, in the field of litigation funding, an opportunity provider may have a litigation case at hand, which may promise the specific prosecution goal such as payment of a specific amount of money (as e.g. damage compensation), claims which allow actions which have been legally prohibited so far, claims which prohibit actions by third parties, claims which require actions of governmental authorities and the like. To achieve such a prosecution goal, prosecution costs need to be expensed including costs such as legal attorney fees and possible costs in case of defeat. In case of low resources at the opportunity provider, to cover these required funding resources, sponsoring partners are needed.

Matching the opportunity provider with the sponsoring partners is usually complicated, time-consuming, non-transparent, and often depending on random parameters. Further, the sponsoring partners want to profit from a successful outcome of the litigation trial, particularly depending on the invested resources in terms of a quote on the outcome of the litigation trial. There often exists a target conflict on the participation quote by which the sponsoring party shall participate on a successful outcome of the litigation trial. So, it is the opportunity provider's interest to keep the participation quote of the sponsoring party as low as possible. On the other hand, the sponsoring party is often only willing to invest resources if a minimum participation quote of a successful outcome will be guaranteed.

Furthermore, matching the opportunity provider with the sponsoring parties may require to allow that the sponsoring parties remain anonymous until the matching process has been terminated. Particularly, anonymity between the sponsoring parties should be secured.

Therefore, a process is required which does not focus on the entities, i.e. opportunity provider and the sponsoring parties, but on the interests embodied as opportunity data and sponsoring data items. What is needed, therefore, is an improved technique for matching opportunity data with one or more sponsoring data items for endeavors, enterprises or ventures such as research cooperation, litigation funding, impact investment, or the like.

SUMMARY OF THE INVENTION

According to the invention a computer-implemented method for automatically matching opportunity data with one or more sponsor data items according to claim 1 and a computer system according to the further independent claim are provided.

Other features and advantages of various aspects and embodiments of the present invention will become apparent from the following description and from the claims.

According to a first aspect a computer-implemented method for matching opportunity data defining an opportunity and at least one sponsor data item to represent a cooperation for commonly undertaking an endeavor, enterprise or venture is provided, comprising the steps of:

- Providing opportunity data about an endeavor, enterprise or venture by an opportunity provider to a computer, wherein the opportunity data is defined by prosecution resources needed to prosecute the opportunity, a best possible outcome in case of success of the prosecution and an ask participation quote,
- Obtaining, at the computer, a plurality of sponsor data items each including a participation offer in a bookbuilding process wherein the participation offers each include a bid participation quote and an amount of sponsoring resources;
- Using the computer to select one or more participation offers from the obtained participation offers depending on the ask participation quote, the prosecution resources, as well as on the bid participation quotes and the sponsoring resources of each of the plurality of the sponsor data items;
- Using the computer to automatically match the sponsor data items associated with the selected one or more participation offers with the opportunity data.

Specifically, the obtaining, at the computer, of the plurality of sponsor data items may include obtaining at least one of sponsor data items in view of the previously obtained sponsor data items, wherein particularly only the bid participation quote and the sponsoring resources associated to each existing sponsor data item are indicated/revealed while other data are kept hidden/secret.

One feature of the above computer-implemented method is to automatically match opportunity data representing an opportunity and one or more sponsor data items by means of a kind of bookbuilding system. The automated bookbuilding system uses a computer to match opportunity data provided by an opportunity provider and sponsor data items each provided by a sponsoring party with the aim to enable the defined opportunity to be seized and to realize the endeavor, enterprise or venture accordingly. The opportunity provider has the opportunity at hand and is allowed to offer participation in the endeavor or venture to seize the opportunity.

The computer is configured to receive input from the opportunity provider in form of opportunity data which represent the opportunity. This opportunity data input indicates apart from information about the opportunity an ask participation quote which defines the opportunity provider's wish for a participation quote of sponsoring parties who want to join the endeavor or venture.

The computer receives input from the sponsoring parties which represent one or more bids each represented by sponsor data items containing offered sponsoring resources associated with a respective bid participation quote. The computer determines that the matching condition is met if a sufficient amount of sponsoring resources is offered associated with a bid participation quote which is equal or lower than the ask participation quote offered by the opportunity provider. The amount of prosecution resources is initially set by the opportunity data according to the needs for prosecuting the endeavor or venture including all resources costs as well as the risk of failure or defeat, respectively.

The above method is implemented in an interactive computer platform which allows a facilitated negotiation between opportunity providers and sponsoring parties with the result to match opportunity data with sponsor data items. Further the above method allows to find an irrevocably binding equal participation quote for the opportunity provider and the sponsoring parties. During the bookbuilding process the sponsoring parties, the source of the corresponding inputs (IP addresses of connected computers) or the like shall remain anonymous so that revealed or displayed sponsor data items cannot be associated with corresponding sponsoring parties by other sponsoring parties. The finally determined participation quote (final participation quote) defines or is related to the portion/percentage of the actual outcome of the prosecution of the opportunity, which will be distributed among the sponsoring parties. The distribution between the sponsoring parties is defined by shares determined by the portion of the respective sponsoring resource on the prosecution resources needed.

Particularly, the matching of the opportunity data with multiple sponsor data items allows the requirements for enabling the opportunity to be prosecuted to be satisfied more quickly and efficiently, because sponsoring resources from different sources can be combined. So, also participation offers providing a lower amount of resources can be matched with the opportunity data. The computer system which performs this matching of multiple sponsor data items with opportunity data is an improvement to computer technology because the computer system which performs this method automatically matches the multiple sponsor data items with the opportunity data to provide a beneficial result which was not achievable by previous computer systems. For example, embodiments of the present invention enable sponsor data items to be collected in the computer anonymously e.g. by different sponsoring parties, via different computers, via different IP addresses or the like. Moreover, existing sponsor data items may be entered or adapted in real time while all previously generated bid participation quotes and associated sponsoring resources of other valid sponsor data items can be immediately considered. So, the generation or adaptation of sponsor data items may be made depending on the existing bid participation quotes and associated sponsoring resources of all existing sponsor data items. Particularly, the bid participation quotes of other valid sponsor data items can be considered in an anonymous manner so that the adapting of the bid participation quote can be made in knowledge of the bid participation quotes of previously obtained sponsor data items but without exposing/revealing some or all other details of the source of the sponsor data item.

Furthermore, as the matching method is performed on a computer-implemented platform the information about changed ask participation quotes and the existing participation offers will be available in real time. This real-time feature of embodiments of the present invention represents an improvement to computer technology, because the computer system which enables the changed participation quotes and the existing participation offers to be available in real-time provides a result which was not achievable by previous computer systems.

Further, the participation offers may be selected from the obtained participation offers as those which have the lowest bid participation quotes which are equal or lower than the ask participation quote.

Particularly, the participation offers may be selected from the obtained participation offers as those which include associated sponsoring resources which sum up to at least the prosecution resources.

It may be provided that if more than one of the obtained participation offers of the highest bid participation quote are selectable only the earliest participation offer is considered so that concurring participation offers will be handled on a first-come, first-served base.

Furthermore, the selecting of the participation offers may be performed after the bookbuilding process has been terminated and not before participation offers has been obtained wherein the participation offers are selected so that the bid participation quotes associated with the selected participation offers are equal or lower than the ask participation quote, and the total of the sponsoring resources associated with all of the selected participation offers is equal or higher than the prosecution resources.

According to a further embodiment the selecting of the participation offers may be performed after a predetermined time period after providing the opportunity.

Moreover, the opportunity may be further defined by a detailed description of the endeavor, enterprise or venture.

Particularly, an opportunity may include a litigation trial with an uncertain outcome or with a purpose to clarify law through an exemplary case or a high court decision, a business opportunity including an impact investment, or a research enterprise.

The best possible outcome after successfully prosecuting the opportunity may be an amount of resources, such as material, goods or money, the obtaining of an allowance claim or a prohibition claim, a knowledge such as a research result.

Further, the prosecution resources may include legal costs, attorney costs, promotion costs, development costs, research costs, any kind of preconditions, and additional costs for an unsuccessful outcome of the endeavor, enterprise or venture.

It may be provided that the prosecution resources, the sponsoring resources and/or the best possible outcome are converted into a resource unit, such as a currency or a kind of unit which make the different items of prosecution resources, the sponsoring resources and/or the best possible outcome resources comparable. Further, conversion process may be based on blockchain. Blockchain-based crypto currencies may be used as resource unit.

Moreover, the ask participation quote may be increased during the bookbuilding process. So, the platform may ask the opportunity provider to adapt the ask participation quote by increasing it during the bookbuilding process.

Further, the bid participation quote may be decreased during the bookbuilding process. So, the platform may ask the sponsoring party to adapt the bid participation quote for given participation offers by decreasing it during the bookbuilding process.

According to an embodiment the platform may ask the opportunity provider to confirm the ask participation quote.

So, the platform may ask the opportunity provider to bindingly confirm the ask participation quote.

Further, the platform may ask the opportunity provider to accept the participation offer. So, the platform may ask the sponsoring party to bindingly accept the participation offer.

Particularly, an endeavor, enterprise or venture defined by the opportunity data may be initiated as soon as the opportunity data have been matched with the sponsor data items.

Further, during the bookbuilding process, a notification may be issued that the bookbuilding process will be terminated soon.

BRIEF DESCRIPTION OF THE DRAWINGS

Embodiments are described in more detail in conjunction with the accompanying drawing in which.

DETAILED DESCRIPTION

Embodiments of the present invention provide a computer-implemented platform for matching opportunity data provided by opportunity providers and sponsor data items provided by sponsoring parties to establish a match for a cooperation e.g. for commonly undertaking an endeavor or venture. The opportunity data and the sponsor data items shall be matched to enable seizing an existing opportunity with common resource funding.

Figure 1:
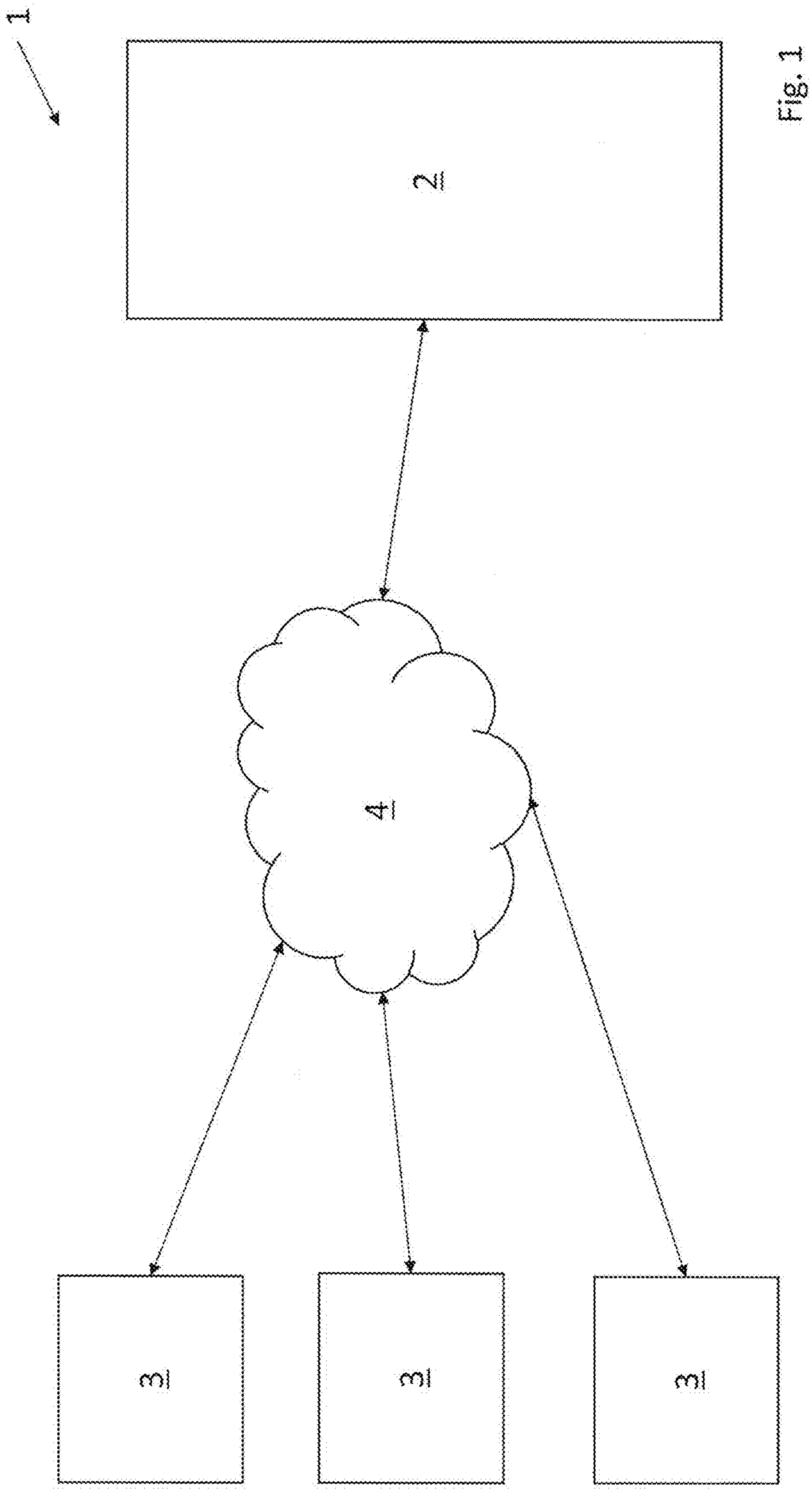
FIG. 1 shows an exemplary client-server architecture in which the bookbuilding process shall be applied.

The matching occurs when offers in terms of total resource requirements for a maximum ask participation quote are satisfied by sponsoring resources funded by sponsoring parties and associated bid participation quotes related to the one or more sponsoring resources offered. The matching platform may be implemented on a client-server architecture 1 as shown in FIG. 1.

The client-server architecture 1 comprises a server system 2 and a plurality of client systems 3 interconnected by various communication networks 4. In the context of the communication networks like the Internet, essentially the server system 2 acts as a service and resource provider and each client can make a request for the service or resources from its client system 3. The present platform is hosted in that server system 2, and the service can be requested by anyone and data can be provided through the client system 3. The following description will detail the functions of the server system 2 providing services to individual entities including opportunity providers and sponsoring parties which operate the client systems 3.

Figure 2:
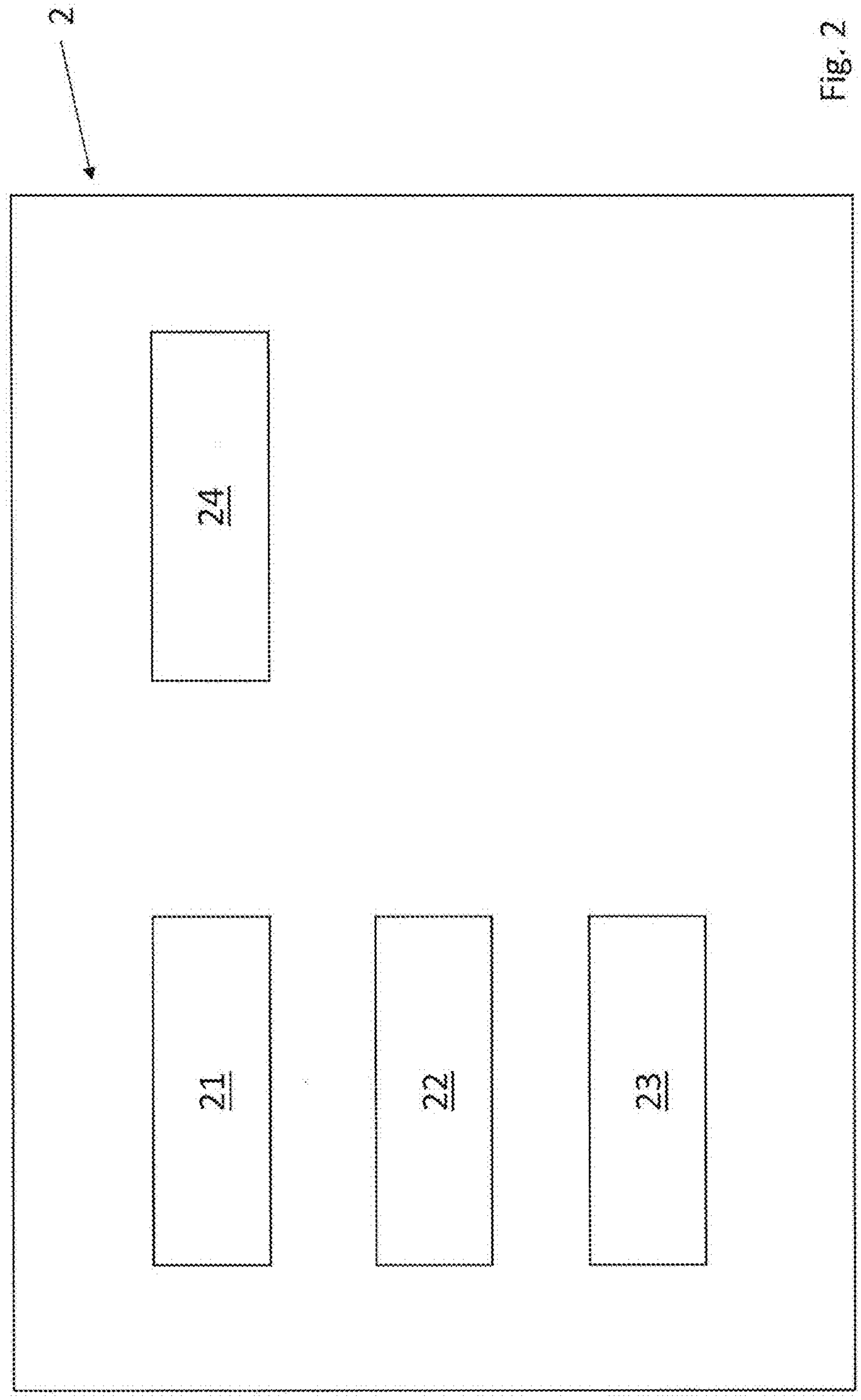
FIG. 2 shows functions of the server system in the client-server architecture of FIG. 1.

As shown in FIG. 2, the functions of the server system 2 are implemented as software which basically includes server applications and databases. The databases include an opportunity database 21, an opportunity provider database 22, and a sponsoring party database 23. Furthermore, the server system 2 provides a microprocessor 24 as part of a computing system which performs a server application to establish the functionality of the matching method as described in detail below. Furthermore, the microprocessor 24 may implement or include a webserver so that a webpage may be used as a carrier of the information and data. The server application running on the microprocessor 24 is the core of the server system 2. It can execute the commands to query and retrieve the databases at a user's request and create the webpage containing the information and the data requested by the user and return it to the user.

The client system 3 may execute a web browser program, the browser exchanges information with the server system 2 for the client and provides the local service. It can send requests and data to the server system 2 and can display a webpage containing resulting information provided by the server system 2. The web browser allows the user to enter an address to direct to the server system 2.

Figure 3:
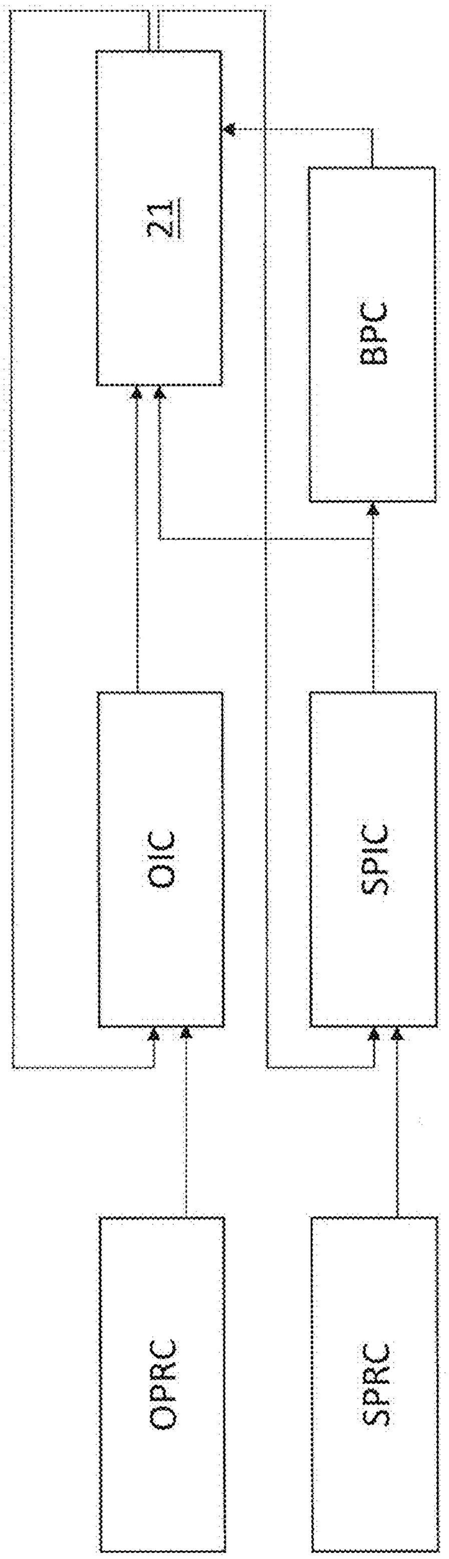
FIG. 3 shows components used in the bookbuilding method and the relationship among these components.

The client system 3 and the server system 2 may provide software components to implement a bookbuilding method which is described in detail below. The components used in the bookbuilding method and the relationship among these components are illustrated in FIG. 3 in detail. The components include: an opportunity provider registration component OPRC, an opportunity input component OIC, a sponsoring party registration component SPRC, a sponsoring party input component SPIC, and a bidding processing component BPC.

The opportunity provider registration component OPRC enables an opportunity provider to register to use the platform. The registration procedure is commonly known for Internet services wherein the user is required to create an opportunity provider ID and a password and to provide the necessary information about the opportunity provider including personal and address data. Information about registered opportunity providers will be stored in the opportunity provider database 22. It has to be ensured that the identity of the user is authorized as the offers of the opportunity providers made on the platform shall be binding.

The same is true for the sponsoring party registration component SPRC which requires a registration of the sponsoring party to use the system by means of a registration procedure. The registration procedure for the sponsoring parties is also commonly known for Internet services wherein every sponsoring party is required to create a sponsoring party ID and a password and to provide the necessary information about the sponsoring party including personal and address data. Information about the registered sponsoring parties will be stored in the sponsoring party database 23. It has to be ensured that the identity of the sponsoring party is authorized as the offers of the opportunity providers made on the platform shall be binding.

Once registered, the opportunity provider may log into an opportunity provider area of the opportunity input component OIC which corresponds to a restricted set of functions associated to entering opportunities of endeavors or ventures into the opportunity database 21. The opportunity provider area provides one or more screen forms to query for some inputs which are described in detail below.

An opportunity is defined by opportunity data and may correspond to any kind of endeavor, enterprise or venture, which shall be prosecuted to obtain an uncertain result. Such an endeavor, enterprise or venture may e.g. relate to a litigation trial with an uncertain outcome, a business opportunity including an impact investment, a research enterprise, a production or infrastructure venture or the like.

Furthermore, together with the opportunity, opportunity data defines the best possible outcome after successfully prosecuting (full success) the opportunity which can be indicated or estimated. The best possible outcome may be an amount of resources, such as material, goods or money, the obtaining of an allowance claim or a prohibition claim, a knowledge such as a research result or the like. Any kind of costs to achieve the best possible outcome shall be considered. Furthermore, the computer receives input from the opportunity provider which is represented by the opportunity data including a detailed description including valuable documents containing essential information describing and concerning the opportunity which allow a third party, i.e. sponsoring parties, to make their own assessments about the likelihood of success for the given opportunity.

Moreover, after registration, the sponsoring party may enter a sponsoring party area of the sponsoring party input component SPIC which corresponds to a restricted set of functions in which the sponsoring party can select interesting opportunities and place bids by sending bid information. The sponsoring party area provides screen forms to query for inputs which are described in detail below.

By means of the bid processing component BIC, the entered opportunity data and the corresponding bid information are processed by the platform to obtain a match between the opportunity data and one or more sponsor data items depending on the corresponding bid information.

Furthermore, via the opportunity provider input component OIC, it may be enabled to modify the opportunity data, as long as the matching process has not been finished. Particularly, the ask participation quote of the opportunity data may be increased, but may not change the offered opportunity otherwise.

Figure 4:
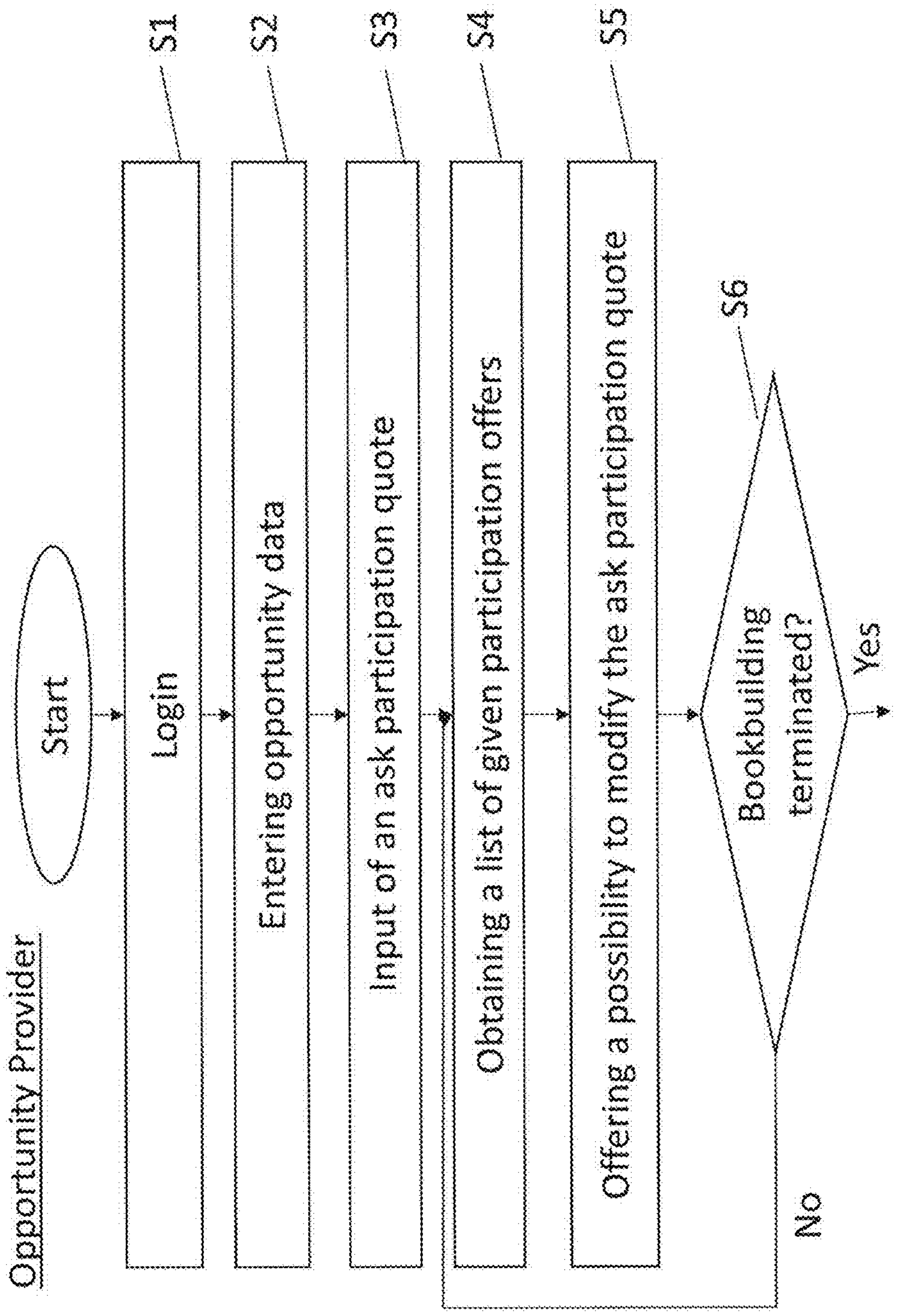
FIG. 4 shows a flowchart describing the matching process for opportunity data.

The bookbuilding process is described in more detail below in conjunction with the flowchart of FIGS. 4 and 5. The flowchart of FIG. 4 shows the process for providing opportunity data.

In step S1 the platform may request an opportunity provider to login into the opportunity provider area.

Furthermore, in step S2, opportunity data representing an opportunity may be entered by indicating the character of the opportunity, the best possible outcome and an amount of prosecution resources necessary to prosecute the opportunity to permit obtaining the best possible outcome. The prosecution resources may include legal costs, attorney costs, promotion costs, development costs, research costs, any kind of preconditions and the like. The prosecution resources may also include additional costs for an unsuccessful outcome of the endeavor, enterprise or venture. In other words, any risks or potential losses are also covered by the prosecution resources. These kinds of prosecution resources as well as the best possible outcome may be evaluated by means of a resource unit which may be a currency, blockchain-based tokens, crypto-currencies or any other kind of unit which make the different items of prosecution resources comparable. The total of the prosecution resources may indicate the funding needs, and the best possible outcome the best possible chance for success.

In step S3, an ask participation quote as an initial information is received by the platform which may form part of the opportunity data. This initial information may represent an offer of the opportunity provider and starts a bookbuilding process which invites sponsoring parties to participate in the full success of the opportunity.

The ask participation quote may indicate the currently maximum quote of participation for the best possible outcome of the opportunity. Consequently, while the prosecution costs indicate a maximum limit of needed prosecution resources in terms of resource units necessary for starting prosecution of the opportunity, the ask participation quote indicates the return on investment if the prosecution of the opportunity will be fully successful. Of course, the result of the opportunity can be all or nothing, or can also correspond to a part of the best possible outcome of the opportunity (partial success). The ask participation quote is considered as 0, if no ask participation quote is entered or no participation of the possible outcome of the opportunity is offered by the opportunity provider.

In step S4, a list of given participation offers (bids) may be displayed or output otherwise. The list may contain representations of one or more sponsor data items (to be described in detail below) including information or offers to indicate support of the opportunity by providing sponsoring resources indicating a specific bid of resources needed for prosecuting the opportunity. The sponsoring resources may be associated/combined with a bid participation quote which corresponds to a currently minimum participation for which the offer shall be valid. The list may be anonymized so that only the existence of a sponsor data item with an indication of the sponsoring resources and bid participation quote associated therewith may be revealed to the source of opportunity data.

In step S5, the computer may query to increase the ask participation quote. This may be carried out automatically or manually as a result of a user query issued by the computer. Particularly, it is enabled to adapt the ask participation quote in view of all of the sponsor data items provided by the sponsoring parties, e.g. to make the opportunity more attractive for possible sponsoring parties or to enable more sponsor data items to be matched with the opportunity data.

In step S6, it is checked by the computer/platform if the bookbuilding process is terminated. If it is determined that the bookbuilding process is terminated the method is continued by step S21 otherwise it is continued with step S4. Substantially it is checked whether a predefined termination condition (as explained below) has been met.

Figure 5:
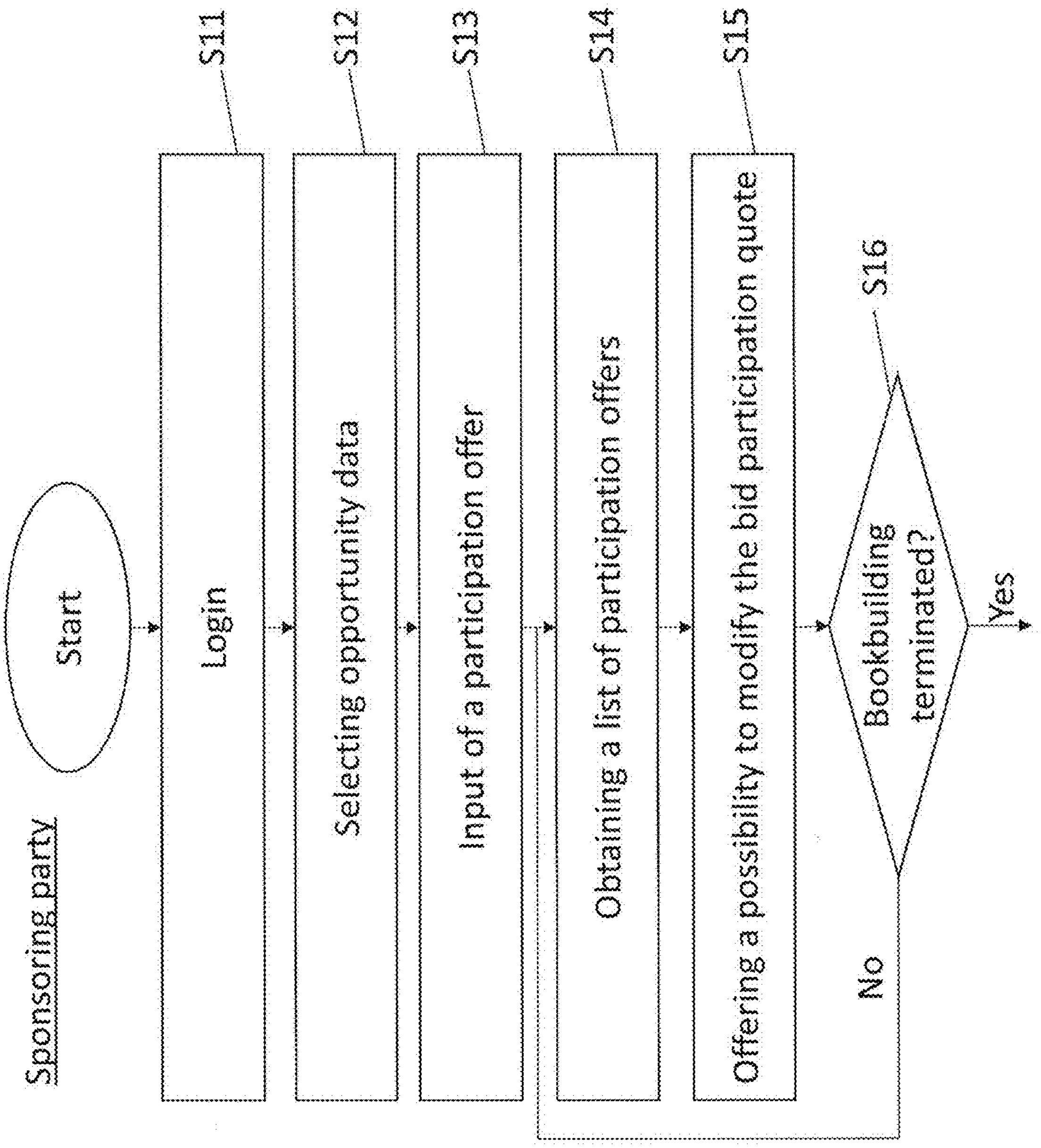
FIG. 5 shows a flowchart describing the matching process for a sponsoring party.

The flowchart of FIG. 5 shows the bookbuilding process for providing sponsor data items.

In step S11 the platform may request a sponsoring party to login into the sponsoring party area.

The process of bidding is started and it is collected sponsor data items taking into account all necessary information about existing opportunities including the opportunity goal and the current ask participation quote. So, in step S12, existing opportunity data is selected among the opportunities represented by the corresponding opportunity data. This may be performed by browsing through a list of items indicating different opportunity data.

In step S13, the opportunity data may be selected by receiving a sponsor data item associated with one of the opportunity data. The sponsor data item includes a participation offer. The participation offer may include an amount of sponsoring resources provided to support the opportunity for a possible match. Together with the sponsor data item an amount of sponsoring resources (or resource units) may be received which indicates the portion of participation on the selected opportunity. The resources to be spent can be an amount of investment (money), existing claims, consultation effort, workforce, material and the like. These sponsoring resources may be converted into the resource unit which is identical to the resource units used with the opportunity data to make the needed prosecution resources comparable.

Further, the participation offer includes a bid participation quote which corresponds to a validity threshold of the participation offer. The validity threshold indicates a lowest acceptable participation quote. If no bid participation quote is given, then the bid participation quote corresponds to 0, meaning that the sponsoring party accepts that they may receive no return for participating on the opportunity according to their participation offer or that the matching with the opportunity data involves no participation.

The offer represented by the sponsor data item is binding so that if it turns out that the final ask participation quote is equal or higher than the bid participation quote, the sponsoring resources (according to the bid participation quotes) must be provided/delivered/paid to the opportunity provider once the bookbuilding process has been finished. On the other hand as the opportunity data also represent a binding opportunity offer it is agreed to the participation quote of the participation offer.

In step S14, a list of given participation offers of other sponsor data items is retrieved wherein the sponsoring parties which provided the sponsor data items are anonymized so that confidentiality is ensured.

In step S15, the bid participation quote of the sponsor data item may be modified, particularly decreased. This may be carried out automatically or manually as a result of a user query. Particularly, it is enabled to adapt the participation quote in view of the existing participation offers represented by other sponsor data items. In this case the existing participation offers are anonymized so that only sponsoring resources and associated bid participation offers are indicated.

In detail, before, while and/or after a sponsor data item has been received, the return on investment may be displayed for a full success of the opportunity and one or more exemplary partial successes. So, the sponsoring parties always have the chance to see a display of existing bids indicating the sponsoring resourced offered and the associated bid participation quote. It will be indicated in the table which bids may contribute to the requirements of the opportunity data in terms of having a bid participation quote equal or lower than the ask participation quote of each of the sponsor data items. Due to the possibility of modification of the asked participation quotes of each of the sponsor data items, a bookbuilding process is performed which allows to render an unconsidered bid considered by lowering the corresponding bid participation quote.

In step S16 it is checked if the bookbuilding process is terminated. If it is determined (option: yes) that the bookbuilding process is terminated the method is continued by step S21 otherwise (option: no) it is continued with step S14. Substantially, it is checked whether a predefined termination condition has been met. The termination condition may include: that a predetermined amount of time has elapsed since start of the bookbuilding process by entering the corresponding opportunity and/or that the bookbuilding process has been successful, i.e. the necessary amount of sponsoring resources needed for prosecuting the opportunity has been offered with bid participation quotes equal or lower than the ask participation quote, could be collected, and/or the opportunity provider declares that the bookbuilding is closed.

Figure 6:
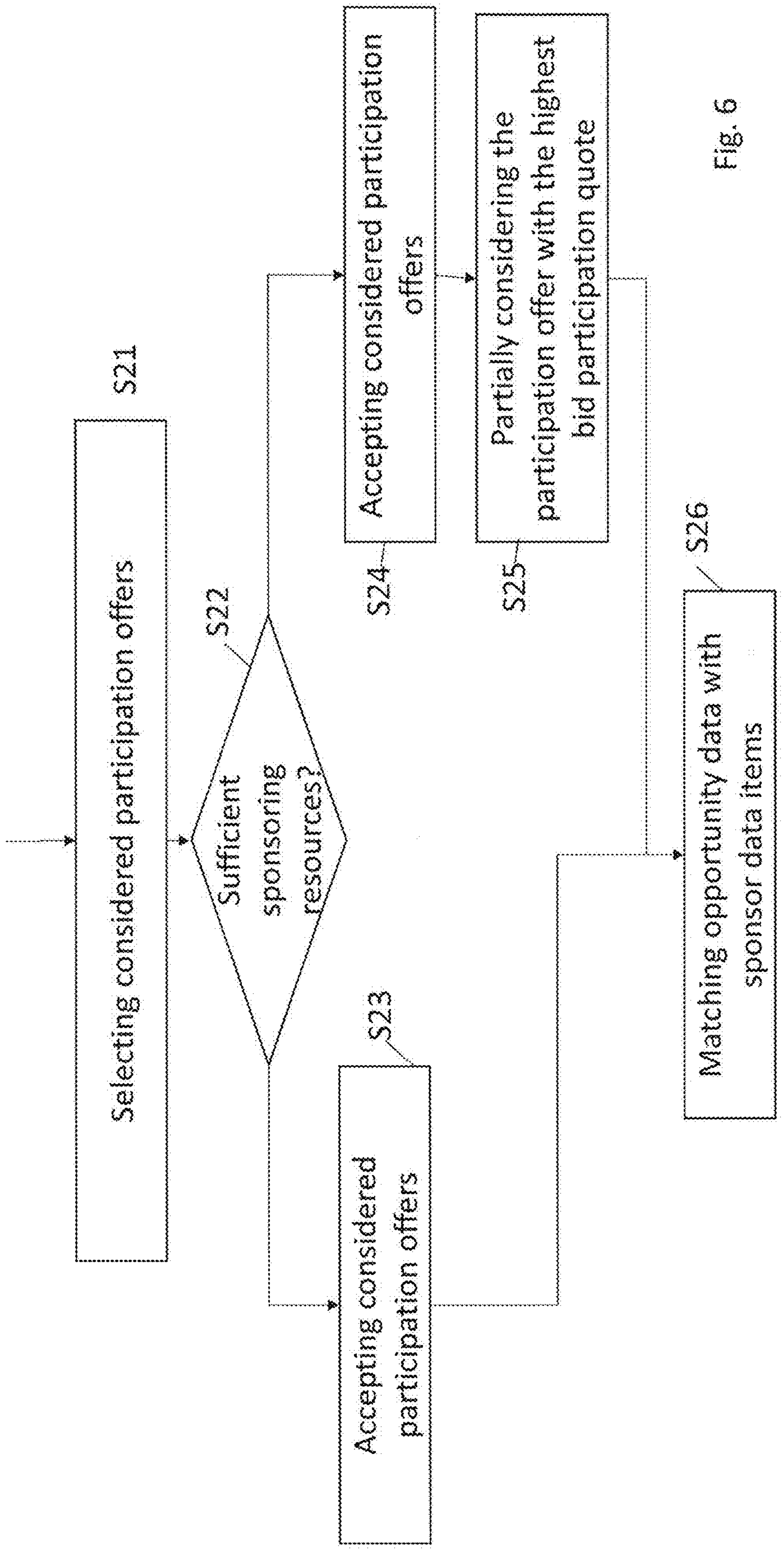
FIG. 6 shows a flowchart for the method for obtaining a result of the matching process.

The flowchart of FIG. 6 shows the process after termination of the bookbuilding process for sponsoring parties.

When it has been determined that the bookbuilding process was successful, in step S21 only those of the collected participation offers including the associated sponsoring resources (amount of resource units) and the associated bid participation quote are considered where the corresponding bid participation quotes are equal or below the ask participation quote.

In step S22, it is checked whether the total of the considered sponsoring resources is sufficient for the funding needs. If, in step S22, it is determined that the total of the sponsoring resources e.g. in terms of the resource units associated with the considered participation offers is equal to the funding needs, all considered participation offers are accepted in step S23. If in step S22 it is determined that the total of the resource units associated with the considered participation offers is higher than the funding needs, the participation offers including the lowest bid participation quote will be considered first until the amount of resource units corresponding to the prosecution resources is reached or exceeded. For instance, the participation orders may be ordered in a list with increasing bid participation quotes and the sponsoring resources will be added for each item from top downwards to the list of considered participation offers until the required prosecution resources are reached or exceeded.

The participation offer considered in step S24 with the highest bid participation quote may be only partially considered in step S25 if the amount of resource units corresponding to the prosecution resources is exceeded. In case there are more than one participation offers of the highest bid participation quote only the earlier participation offer(s) is (are) considered in step S25. So, in case of concurring participation offers having the same bid participation quote, the bids will be handled on a first-come, first-served base so that the latter participation offer(s) will be neglected or at least partially neglected.

All considered participation offers will now be used for matching the opportunity data with the sponsor data items referred to the considered participation offers. Accordingly, for instance, the considered participation offers may be used to finance/support/prosecute the opportunity in step S26 according to a final participation quote which corresponds to the highest participation quote of the considered participation offers. The portion of each sponsor data item in terms of financing/support/prosecution is defined by the portion of the (considered part of) sponsoring resources of each sponsor data item with respect to the required prosecution resources. This portion substantially may represent a share of how the sponsor data item will be associated with the actual outcome of the opportunity.

The possibility that the participation quote is modified/changed during the bidding process at any time allows finding an optimal participation quote for both the opportunity represented by the opportunity data and the offers represented by the sponsor data items through the computer-based quote balancing mechanism as described above.

During the bookbuilding process, notifications can be issued, e.g. by email, that the bookbuilding process will end soon so that the bid participation quotes can be modified if necessary.

After the bookbuilding process has been finished and the matching between the opportunity data and the sponsor data items has been fully prosecuted, equal participation quotes are applied on the outcome of the prosecution of the opportunity according to the highest participation quotes of all considered participation offers (bids).

In the event that it turns out that the prosecution costs are not sufficient to fully prosecute the opportunity, the sponsoring parties have the right of first option to supplement the biddings by increasing the sponsoring amount. Consequently, the sponsoring amount can be increased. Therefore, it is queried whether the sponsor data item shall be changed by increasing corresponding sponsoring amount. Particularly, the sponsoring parties may be informed and asked to supplement the bidding and/or a call for additional sponsoring parties on the platform will be made. This can be in the form of a new bookbuilding process where the prosecution resources will be the additional resources needed. Existing and additional sponsoring parties may place participation offers including sponsoring resources and bid participation quotes.

In order to compensate the sponsoring parties in the case where the prosecution goal has not been achieved or not fully been achieved, i.e. where the outcome stays below the expected success, the prosecution success may be distributed in an adjusted manner. So, the sponsoring parties may benefit from an adjusted distribution of the prosecution success. This procedure shall protect the investment of the sponsoring parties and is called herein sponsor protection. Here, the return on investment for the sponsoring parties may be set to have a higher priority than the success of the opportunity provider. This may help to motivate the opportunity provider who is responsible for prosecution of the opportunity to keep on with prosecution of the opportunity as there will be a return only with a higher success rate.

Figure 7:
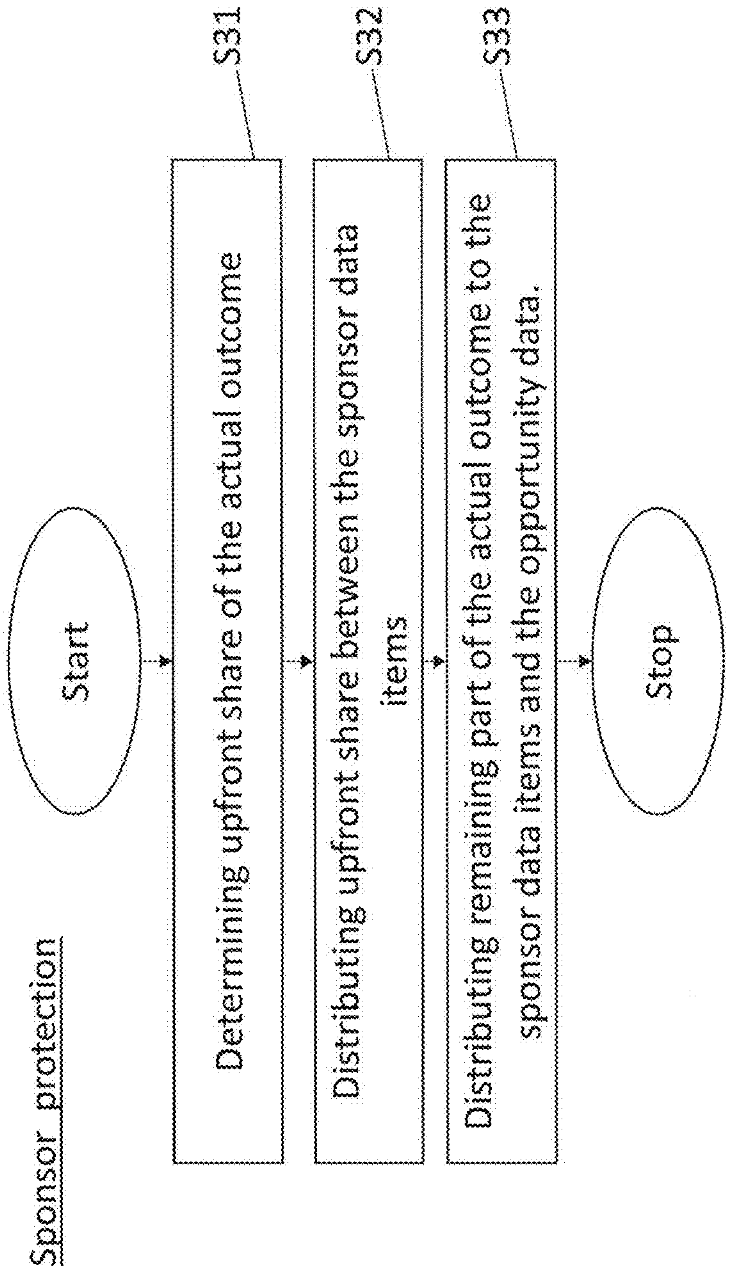
FIG. 7 shows a flowchart of the process of sponsor protection.

The process of sponsor protection is illustrated by the flowchart of FIG. 7.

Sponsor protection can be achieved by associating an upfront part of resources/amount of resource units to the sponsor data items before a remaining part of resources resulting from the prosecution success is associated to the opportunity data and the sponsor data items in a distributed manner. Resources associated to the opportunity data or sponsor data items might by refunded to the respective user or origin of the data or data item.

For sponsor protection, the sponsoring parties shall benefit from an adjusted distribution of the outcome of the prosecution of the opportunity.

This is accomplished by associating an upfront share of the actual outcome of the prosecution (upfront share) in step S31 which is determined depending on an upfront quote. The upfront quote determines the portion of the actual outcome to be distributed among the sponsoring parties first before the remaining portion of the actual outcome is distributed among each of the sponsor data items and the opportunity data. The upfront quote may be determined depending on the actual outcome of the prosecution and the best possible outcome, such as e.g.:

$$\text{Upfront quote} = 1 - (\text{actual outcome}/\text{best possible outcome})$$

Substantially, the upfront share as e.g. determined by $$\text{Upfront share} = \text{Upfront quote} \times \text{prosecution resources}$$

is commonly associated to the considered sponsor data items e.g. for distribution among the sponsoring parties.

In step S32, this upfront share is shared between the sponsor data items according to the portion of the respective sponsoring resources with respect to the total of considered sponsoring resources which equals the required prosecution resources.

In step S33, after associating and sharing the upfront part of the actual outcome the remaining part of the actual outcome (which is (actual outcome-upfront share), if any, is commonly associated to the sponsor data items and the opportunity data.

Portions and shares as indicated above may be calculated on the basis of resource units.

Following to the upfront distribution of the upfront share to the sponsoring parties the remaining portion of the actual outcome (actual outcome-upfront share) is associated according to the final participation quote. This distribution is made according following scheme:

$$\text{Opportunity data: } (1 - \text{final participation quote}) \times (\text{actual outcome} - \text{upfront share})$$

For each sponsor data item, the portion of actual outcome will be depending on the associated sponsoring resources:

Upfront Distribution for Each Sponsor Data Item:

upfront share×sponsoring resources/prosecution resources

Distribution of Remaining Part for Each Sponsor Data Item:

$$\text{final participation quote} \times (\text{actual outcome} - \text{upfront share}) \times \text{sponsoring resources}/\text{prosecution resources}$$

Particularly, the upfront share and the distribution of the remaining part can be interpreted as a degree of participation of the sponsor data items at the actual outcome.

The afore-described matching method can be well applied to a litigation funding process wherein the opportunity provider may be a lawyer having a client (plaintiff) with a legal claim which needs to be enforced by court. Due to a lack of funding for prosecution, the client (opportunity provider) as a potential plaintiff may agree that his case is entered into the opportunity database and a bookbuilding process is started. While entering the litigation case into the database, the lawyer calculates the maximum costs of the proceedings including risks which corresponds to the funding needs, and the prosecution goal which may correspond to the best possible outcome of the litigation trial under full success. The prosecution costs are then open to be covered by the bookbuilding process.

Now it is up to the lawyer/client (opportunity provider) to decide about the ask participation quote, i.e. the participation quote the client is willing to offer for the sponsoring parties in case of success. For litigation funding, the prosecution resources may be mainly requested as amount of money which in this matter may correspond to the resource unit. However also other kind of resources may be required as well such as individual legal claims, workforce or the like.

The sponsoring party may be informed by browsing the opportunity database of the open opportunity for litigation trial and are invited to enter bids for an amount of money they want to invest associated to a bid participation quote they can choose. The ask participation quote entered by the opportunity provider, however, determines whether the bid of the sponsoring party is in or out, i.e. contributing to the litigation funding or not, depending on the given ask participation quote.

Once the bookbuilding process has been terminated and the litigation trial has been fully prosecuted, an equal final participation quote is applied on the outcome of the prosecution of the opportunity according to the highest participation quotes of all considered participation offers.

The afore-described matching method can also be applied to a planned project where the expected outcome is a permanent supply of a commodity, such as electrical power. The planned project may be a power plant building project which shall after establishing be operated to provide a steady supply of electrical power. Such a project may be entered as an opportunity and implies the provision of sponsoring resources defined by the opportunity provider, such as material, land, workforce, knowhow and the like by the sponsoring parties.

Further, the best possible outcome may include or correspond to a steady supply of resources (commodities) such as electrical power which can then be shared according to a relation determined by each of the considered sponsoring resources (amount of corresponding resource units), the prosecution resources and by the final participation quote determined by above described matching method.

A further application for the above matching method can be a research cooperation process wherein the opportunity provider may introduce a research project which needs to be carried out requiring a set of equipment, workforce, funding, materials and the like as prosecution resources. The outcome can be a research result which can be shared among the opportunity provider and the sponsoring parties by sharing the license or marketing of the research result according to the final participation quote.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention enable sponsor data items to be provided anonymously e.g. by different sponsoring parties. Furthermore, existing sponsor data items may be adapted in real time wherein all previously generated bid participation quotes of other valid sponsor data items can be immediately considered. Particularly, the bid participation quotes of other valid sponsor data items can be considered in an anonymous manner so that the adapting of the bid participation quote can be made in knowledge of the bid participation quotes of previously obtained sponsor data items but without exposing the source of the sponsor data item. These are functions which are inherently computer-implemented and which could not be performed manually or mentally by a human.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element (s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. Computer-implemented method for matching opportunity data defining an opportunity and at least one sponsor data item to represent a cooperation for commonly undertaking an endeavor, enterprise or venture, comprising the steps of:

Providing opportunity data about an endeavor, enterprise or venture from a source to a computer, wherein the opportunity data is defined by prosecution resources needed to prosecute the opportunity, a best possible outcome in case of success of the prosecution and an ask participation quote, Obtaining, at the computer, a plurality of sponsor data items each including a participation offer in a bookbuilding process wherein the participation offers each include a bid participation quote and an amount of sponsoring resources, wherein the obtaining of the plurality of sponsor data items includes obtaining at least one of sponsor data items in view of the previously obtained sponsor data items, wherein only the bid participation quote and the sponsoring resources associated to each existing sponsor data item are indicated or revealed while other data of the sponsor data items are kept hidden;

Dynamically adjusting, during the bookbuilding process, at least one of: (i) the ask participation quote by increasing the ask participation quote in view of the obtained bid participation quotes and associated sponsoring resources of the sponsor data items, and (ii) the bid participation quote of a sponsor data item by decreasing the bid participation quote in view of the obtained bid participation quotes and associated sponsoring resources of the obtained other sponsor data items;

Using the computer, selecting one or more participation offers from the obtained participation offers depending on the ask participation quote, the prosecution resources, as well as on the bid participation quotes and the sponsoring resources of each of the plurality of the sponsor data items; and Using the computer to automatically match the sponsor data items associated with the selected one or more participation offers with the opportunity data.

2. Matching method according to claim 1, wherein the participation offers are selected from the obtained participation offers as those which have the lowest bid participation quotes which are equal or lower than the ask participation quote, wherein particularly the participation offers are selected from the obtained bid participation offers as those which include associated sponsoring resources which sum up to at least the prosecution resources.

3. Matching method according to claim 2, wherein if more than one of the obtained participation offers of the lowest bid participation quote are selectable only the earliest participation offer is considered so that concurring participation offers will be handled on a first-come, first-served base.

4. Matching method according to claim 1, wherein the selecting of the participation offers is performed in the computer after the bookbuilding process has been terminated wherein the participation offers are selected so that the bid participation quotes associated with the selected participation offers are equal or lower than the ask participation quote, and the total of the sponsoring resources associated with all of the selected participation offers is equal or higher than the prosecution resources, wherein the selecting of the participation offers is performed after the bookbuilding process has been terminated, particularly not before the opportunity provider indicates an end of the method for matching.

5. Matching method according to claim 1, wherein the opportunity is further defined by a detailed description of the endeavor, enterprise or venture, wherein particularly the opportunity includes a litigation trial with an uncertain outcome, a business opportunity including an impact investment, or a research enterprise.

6. Matching method according to claim 1, wherein the best possible outcome after successfully prosecuting the opportunity is an amount of resources, such as material, goods or money, the obtaining of an allowance claim or a prohibition claim, a knowledge such as a research result, wherein the prosecution resources include legal costs, attorney costs, promotion costs, development costs, research costs, any kind of preconditions, and additional costs for an unsuccessful outcome of the endeavor, enterprise or venture, wherein the prosecution resources, the sponsoring resources and/or the best possible outcome are converted into a resource unit in the computer, such as a currency or blockchain-based token or a kind of unit which make the different items of prosecution resources, the sponsoring resources and/or the best possible outcome resources comparable.

7. Matching method according to claim 1, wherein a share of how each of the selected sponsor data item will be associated with the actual outcome of the opportunity is defined by the portion of the sponsoring resource of each sponsor data with respect to the required prosecution resources.

8. Matching method according to claim 7, wherein an endeavor, enterprise or venture defined by the opportunity data is initiated as soon as the opportunity data has been matched with the sponsor data items.

9. Method for resolving the degree of participation of sponsor data items at an opportunity defined by opportunity data after a termination of prosecution of the opportunity; wherein an outcome of the prosecution of an opportunity is distributed depending on a final participation quote, wherein the final participation quote is particularly defined as the highest participation quote of the selected participation offers according to the method of claim 1.

10. Method according to claim 9, wherein an upfront share of the actual outcome is distributed among the sponsor data items while the remaining part of the outcome is distributed among the opportunity provider and the sponsoring parties according to the final participation quote.

11. Computer system for matching opportunity data defining an opportunity and at least one sponsor data item to represent a cooperation for commonly undertaking an endeavor, enterprise or venture, wherein the system is configured to:

receive opportunity data about an endeavor, enterprise or venture, wherein the opportunity data is defined by prosecution resources needed to prosecute the opportunity, a best possible outcome in case of success of the prosecution and an ask participation quote, obtain a plurality of sponsor data items each including a participation offer in a bookbuilding process wherein the participation offers each include a bid participation quote and an amount of sponsoring resources, wherein the system is further configured to obtain at least one of sponsor data items in view of the previously obtained sponsor data items, wherein only the bid participation quote and the sponsoring resources associated to each existing sponsor data item are indicated or revealed while other data of the sponsor data items are kept hidden, dynamically adjust, during the bookbuilding process, at least one of: (i) the ask participation quote by increasing the ask participation quote in view of the obtained bid participation quotes and associated sponsoring resources of the sponsor data items, and (ii) the bid participation quote of a sponsor data item by decreasing the bid participation quote in view of the obtained bid participation quotes and associated sponsoring resources of the obtained other sponsor data items, select one or more participation offers from the obtained participation offers depending on the ask participation quote, the prosecution resources, as well as on the bid participation quotes and the sponsoring resources of each of the plurality of the sponsor data items; and automatically match the sponsor data items associated with the selected one or more participation offers with the opportunity data.

12. Computer system according to claim 11, wherein the system is configured to provide a query to allow the participation offers to be selected from the obtained participation offers as those which have the lowest bid participation quotes which are equal or lower than the ask participation quote or wherein the system is configured to provide a query to allow the participation offers to be selected from the obtained bid participation offers as those which include associated sponsoring resources which sum up to at least the prosecution resources.

13. Computer system according to claim 11, wherein the system is configured to consider only the earliest participation offer if more than one of the obtained participation offers of the lowest bid participation quote are selectable, so that concurring participation offers will be handled on a first-come, first-served base.

14. Computer system according to claim 11, wherein the system is configured to select the participation offers after the bookbuilding process has been terminated wherein the participation offers are selected so that the bid participation quotes associated with the selected participation offers are equal or lower than the ask participation quote, and the total of the sponsoring resources associated with all of the selected participation offers is equal or higher than the prosecution resources.

15. Computer system according to claim 11, wherein the system is configured to select the participation offers after the bookbuilding process has been terminated, particularly not before the opportunity provider indicates an end of the method for matching.

16. Computer system according to claim 11, wherein the system is configured to convert the prosecution resources, the sponsoring resources and/or the best possible outcome into a resource unit, such as a currency or blockchain-based token or a kind of unit which make the different items of prosecution resources, the sponsoring resources and/or the best possible outcome resources comparable.

* * * * *